Figure 1:
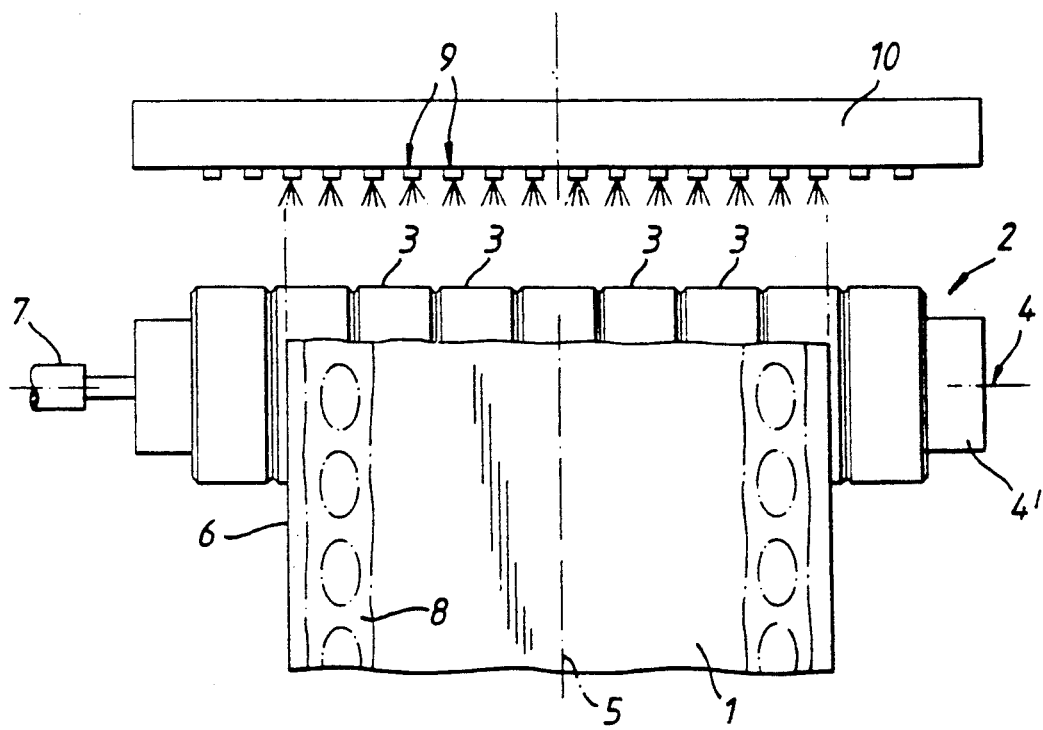

United States Patent [19]

Gore et al.

[11] Patent Number: 5,161,398
[45] Date of Patent: Nov. 10, 1992

[54] MEASUREMENT OF SHAPE OF METAL STRIP

[75] Inventors: Trevor A. Gore, Poole; Peter G. Grocock, Wareham; Philip F. Round, Wimborne, all of England

[73] Assignee: Davy McKee (Poole) Limited, England

[21] Appl. No.: 730,869
[22] PCT Filed: Feb. 5, 1990
[86] PCT No.: PCT/GB90/00171
   § 371 Date: Jul. 22, 1991
   § 102(e) Date: Jul. 22, 1991
[87] PCT Pub. No.: WO90/09249
   PCT Pub. Date: Aug. 23, 1990

[30] Foreign Application Priority Data

Feb. 7, 1989 [GB] United Kingdom ............... 8902621

[51] Int. Cl.⁵ .................... B21B 37/06; G01L 5/04
[52] U.S. Cl. ............................... 72/12; 72/17;
            72/247; 73/862.07; 73/159; 226/179
[58] Field of Search ................ 72/12, 17, 201, 247,
       72/250, 21, 24, 34; 73/159, 862.07, 862.39,
                            862.45, 862.47; 226/179

[56] References Cited
U.S. PATENT DOCUMENTS

| 2,766,041 | 10/1956 | Teplitz ............... 226/179 |
| 3,442,104 | 5/1969 | Misaka et al. ............ 72/12 |
| 3,570,624 | 3/1971 | O'Connor .............. 73/159 |
| 3,890,834 | 6/1975 | Henze ................. 73/159 |
| 4,289,005 | 9/1981 | Cabaret et al. ........... 72/12 |
| 4,744,235 | 5/1988 | Schiller ............... 72/247 |
| 4,750,343 | 6/1988 | Richter et al. ............ 72/17 |

FOREIGN PATENT DOCUMENTS 2452876  5/1975  Fed. Rep. of Germany ......... 72/12

Primary Examiner—Lowell A. Larson
Assistant Examiner—Thomas C. Schoeffler
Attorney, Agent, or Firm—Lee, Mann, Smith, McWilliams, Sweeney & Ohlson

[57] ABSTRACT

In the rolling of metal strip, a detector roll is used to determine variations along the width of the strip and to make sure that one lateral edge of the strip takes up a predetermined position with an individual roller on the detector roll, either the strip is moved sideways with respect to the roll or the roll is moved in the direction of its axis of rotation.

5 Claims, 1 Drawing Sheet

MEASUREMENT OF SHAPE OF METAL STRIP

It is well known to determine the shape of metal strip moving in the direction of its length under tension by passing the strip in contact with part of the periphery of a detector roll which is rotatable about an axis extending at right angles to the direction of movement of the strip. The detector roll determines the tension in the strip at intervals across its width and a variation in tension across the width of the strip indicates that the strip is not of uniform shape across its width.

A well known detector roll, sold under the trade name VIDIMON, comprises a number of rollers arranged side-by-side and rotatable about a common axis. Each roller has detector means associated with it for determining the force applied to the roller by the part of the strip which engages the periphery of the roller. The force is representative of the tension in that part of the strip.

To be able to determine the strip tension at its edges, the two lateral edges of the strip must engage with the detector roll, i.e. the width of the strip must not be greater than the overall length of the roll. However, if the width of the strip is not exactly equal to the length of the roll, or to a multiple of the width of each roller, at least one of the outer rollers of the roll will have strip contacting it along only a portion of its periphery in the direction which is parallel to its axis of rotation. In this event, the detector associated with that roll will not indicate a true value of the force applied to the roll by the strip and a false impression of the shape of the edge of the strip will be given. However, this can be taken into account when determining the force indicated by the detector if the position of the edge of the strip on the roller is known.

For strip of certain widths, the rollers at both ends of the roll may give a false impression of the shape of the edges of the strip.

Furthermore, when rolling metal strip, it is often the case that the edges of the strip ar "tight" whereas, just inboard of each edge, there is a longitudinally extending "loose" region If the edge and the longitudinally extending loose region engage with the same roller of the detector roll, the relatively high force applied to the roller by the tight edge offsets, to some extent, the lower force applied to the roller by the loose region and, consequently, the force indicated by the detector associated with that roller does not give an indication of the shape of either the edge or the loose region of the strip.

It is an object of the present invention to provide a method of, and apparatus for, overcoming these difficulties.

According to a first aspect of the present invention, in a method of determining the shape of metal strip rolled in a rolling mill wherein, on leaving a stand of the mill, the strip has tight edge regions with longitudinally extending loose regions inboard of the edge regions and the strip moving in the direction of its length under tension is passed around part of the periphery of a detector roll having a length greater than the width of the strip, said detector roll comprises a plurality of rollers arranged side-by-side and rotatable about an axis which is normal to the direction of movement of the strip and each roller having a detector associated with it for determining the force applied to the roller by the strip, characterised in that either the path taken by the strip relative to the detector roll is adjusted or the axial position of the detector roll relative to the path taken by the strip is adjusted so that at least one of the lateral edges of the strip takes up a predetermined position with respect to the roll such that the edge region and the loose region inboard thereof engage with different rollers.

With both of these embodiments at at least one edge of the strip the edge and the loose region engage with adjacent rollers.

According to a second aspect of the invention, a detector roll for use in determining the shape of metal strip rolled in a rolling mill comprises a plurality of rollers arranged side-by-side and rotatable relative to a support structure about a common axis, each roller having a detector associated with it for determining force applied to the roller by metal strip passing around part of the periphery of the roller, characterised in the provision of means for displacing all the rollers together in the direction of the common axis relative to the support structure.

Figure 2:
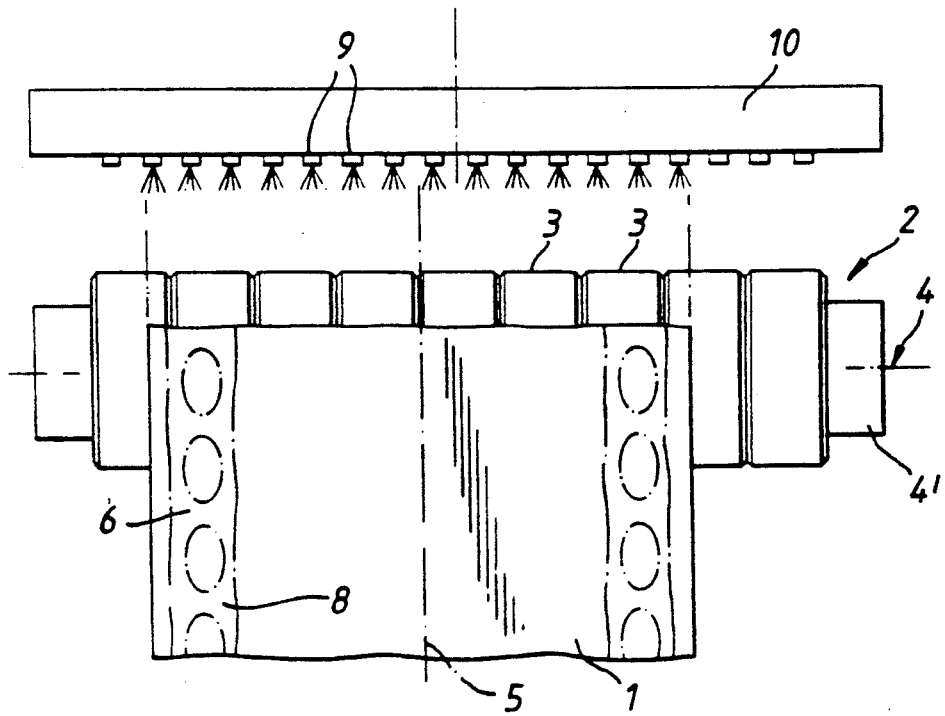

In order that the invention may be more readily understood, it will now be described, by way of example only, with reference to the accompanying drawings, in which:

FIG. 1 shows strip centered on roller 3 wherein the position of edge 6 with respect to roller 3 is arbitrarily dependent on strip width; and, FIG. 2 shows strip wherein the position of edge 6 is maintained at predetermined position relative to roller 3.

A hot metal strip 1 leaving a stand, usually the last stand, of a multi-stand rolling mill is moving in the direction of its length. The strip passes over and engages with the periphery of a detector roll 2 which consists of a plurality of rollers 3 arranged side-by-side and rotatable about an axis 4 of an arbor 4'. Each roller has a detector (not shown) associated with it which detects the force applied to the roller by the portion of the strip engaging it. A detector roll of this type is well known and is sold by Davy McKee (Poole) Limited, Wallisdown Road, Poole, Dorset BH12 5AG, England under the Trade Mark VIDIMON. A device 7, which may take the form of a fluid operable piston-cylinder device, is coupled to the end of the roll to axially displace the detector roll relative to a support structure (not shown).

Referring to FIG. 1, the centre-line of the strip is indicated by reference 5 and, if the roller 3 at the centre of the roll is centred on the centre-line 5, as shown in FIG. 1, the outer edge 6 of the strip bears against the periphery of a roller 3 but, depending upon the width of the strip, a part of the periphery of the roller does not have strip bearing against it. The signal obtained from the detector associated with that roller will be different from the signals obtained from other rollers which have strip bearing against them over the entire length of the roller. This can be taken into account when considering the output of the detector.

However, it is essential for the tight edge 6 of the strip to be arranged to bear against one of the rollers and the part of the strip which bears against the adjacent roller is the inboard region 8 which is subject to "loose" rolling. In this way the tight edge 6 of the strip and the loose region 8 of the strip are on adjacent rollers and their effect can be determined by the appropriate rollers. This is not shown in FIG. 1 but is shown in FIG. 2.

The detector roll may be displaced axially by the device 7 to bring this about.

Alternatively, as shown in FIG. 2, the detector roll may be kept in a fixed position and the track taken by the strip through the stands of the rolling mill may be shifted sideways, i.e. off-centre rolling, so that the lateral edge of the strip takes up the predetermined position with respect to the roller against which it engages so that the tight edge and the loose inboard region engage different rollers.

Spray nozzles 9 mounted on a spray bar 10 are employed to cool the work rolls of one or more stands and the sprays are controlled with reference to the strip tension at regions across its width as determined by the detector roll. Conveniently, there are two spray nozzles 9, corresponding to each roller 3, and, by controlling the sprays, particularly those corresponding to the outermost rollers, the coolant applied to the rolls serve to change the contours of the rolls to bring about an improvement in the shape of the strip as it is rolled.

The spray nozzles could, alternatively, be used to spray lubricant on to the strip before it enters into one of the mill stands.

We claim:

1. A method of determining shape of metal strip which on leaving a stand of a rolling mill in which it has been rolled has a length and a width, and is moving in a direction parallel to its length, and in which opposite two edges of the strip which extend along the length of the strip and a first region adjacent each edge and extending parallel to the length of the strip have been rolled tight and inboard of each first region there is a second region extending parallel to the length of the strip which has been rolled loose; the method comprising the steps of applying tension to the strip, said tension extending parallel to the length of the strip; passing the strip around part of a peripheral surface of a detector roll to apply force thereto; said roll having a length greater than the width of the strip and comprising a plurality of rollers arranged side-by-side and rotatable about an axis which is normal to the direction of movement of the strip and each having a detector associated with it for determining the force applied to the roller by the strip, the force being indicative of the shape of a part of the strip which engages the roller; and arranging relative positions of the strip and the rollers so that one of the edges of the strip and the first region adjacent thereto engage with a different roller from the second region inboard of said first region.

2. The method of claim 1, in which the strip follows a path relative to the detector roll and said path is chosen so that the tight first region adjacent one of the edges of the strip and the loose second region inboard thereof engage with different rollers.

3. The method of claim 1, in which the strip follows a path relative to the detector roll and an axial position of the detector roll relative to the path is chosen so that the tight first region adjacent one of the edges of the strip and the loose second region inboard thereof engage with different rollers.

4. A detector roll for use in determining shape of metal strip rolled in a rolling mill comprising a plurality of rollers arranged side-by-side and rotatable relative to a support structure about a common axis, each roller having a detector associated with it for determining force applied to the roller by metal strip passing around part of a peripheral surface of the roller, and means for displacing all of the rollers together in a common axial direction relative to the support structure.

5. A detector roll as claimed in claim 4, in which the displacing means is a fluid operable piston-cylinder device.

* * * * *